United States Patent [19]
Shirai et al.

[11] 3,724,133
[45] Apr. 3, 1973

[54] MEANS FOR OPENING AND CLOSING A WINDOW ASSEMBLY OF A VEHICLE

[75] Inventors: Takeaki Shirai, Nagoya; Masumi Kato, Aichi; Kiyomitsu Oshikawa, Kariya, all of Japan

[73] Assignee: Nippondenso Kabushiki Kaisha, Kariya-shi, Aichi-ken, Japan

[22] Filed: Mar. 25, 1971

[21] Appl. No.: 127,956

[30] Foreign Application Priority Data

Apr. 3, 1970 Japan ............................... 45/28717
Apr. 4, 1970 Japan ............................... 45/28925

[52] U.S. Cl. ................................................. 49/349
[51] Int. Cl. ........................... E05f 11/44, E05f 15/16
[58] Field of Search ..................... 49/348–351, 227; 310/83, 154; 74/640

[56] References Cited

UNITED STATES PATENTS 3,359,684  12/1967  Tinder ........................... 49/349

*Primary Examiner*—J. Karl Bell
*Attorney*—Cushman, Darby & Cushman

[57] ABSTRACT

Means for automatically opening and closing a window assembly of a vehicle comprising an X-shaped linkage assembly, a power unit and three rollers rotatably secured to the linkage assembly, the rotation of power unit being transmitted to an internal gear provided at an arm forming the linkage, thereby moving up or down the arm and opening and closing the window assembly.

5 Claims, 11 Drawing Figures

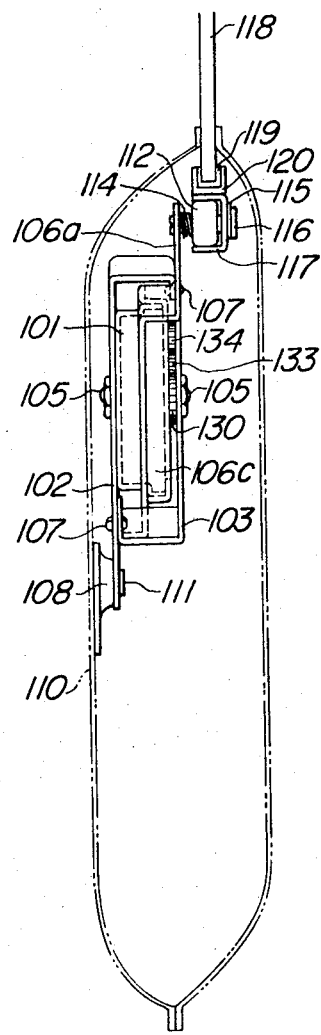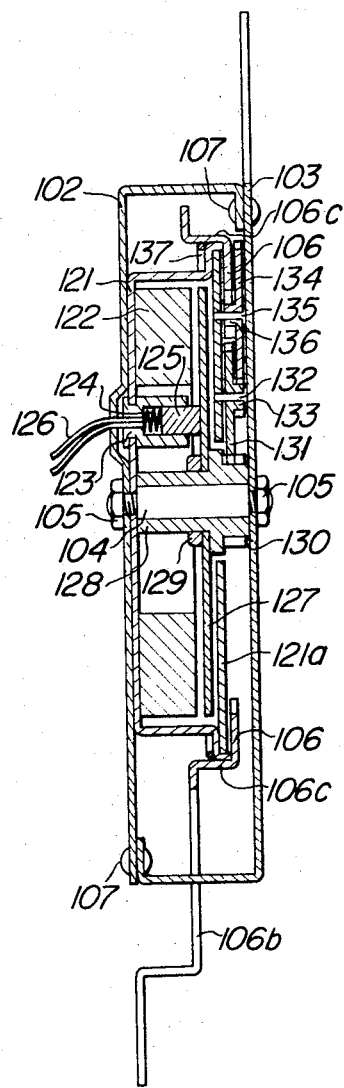

MEANS FOR OPENING AND CLOSING A WINDOW ASSEMBLY OF A VEHICLE

BACKGROUND OF THE INVENTION

1. Field of the Invention

The present invention relates to a means for automatically opening and closing a window assembly of a vehicle such as a motor car.

According to the present invention, a means for automatically opening and closing a window assembly is provided, which is characterized in that a linkage mechanism near to the framework of the door or the body of the vehicle is operated by means of a motor having a reducer which motor is incorporated into the linkage mechanism. In this means, an internal gear is used as an output means for the reducer, which internal gear is formed on one of the arms forming the linkage mechanism. These arms are arranged so as to describe a predetermined trace when the motor is on.

2. Description of the Prior Art

The means for automatically opening and closing a window assembly has been developed, this kind of the prior means having a fan-shaped gear member cooperated with a motor, a link pivoted on the gear member, and an X-shaped linkage mechanism connected to the link, the window assembly being automatically opened and closed by operating the linkage mechanism using the motor.

The above prior means may be operated as follows. The revolutions of the motor are transmitted to a small diameter gear, and then the fan-shaped gear member is rotated through the gear. The link rotatably secured on a part of the fan-shaped gear member is swingable around a fulcrum thereon, that is, a point connecting the link with the gear member. The end portion of the link is rotatably connected to a first arm, one end of which is rotatably secured to a support fixed on the door. A second arm is pivotably connected to the center portion of the first arm by a pin so as to make an X-shaped linkage mechanism. Each end portions of the first and second arms are provided with rollers, respectively. Sliders are fixed to the framework of the window and another slider is fixed to the inner structure of the door. Said rollers are so positioned as to be slidable within said sliders along the longitudinal direction thereof. Thus, the motion of the link in one direction causes the first arm to be rotated and at the same time the second arm to be displaced. As a result, each roller slides within the sliders, thereby shifting the window assembly upward and downward.

It will be understood from the above description that a power unit and a linkage mechanism of the prior device are separately constructed, and they are connected to one another through a link, the power unit comprising the motor with a reducer, the gear having a small diameter and the fan-shaped gear, on the other hand, the linkage mechanism comprising the first arm and the second arm. Therefore, it has tendency to occupy too much space in the inner structure of the door for installation of the prior device and it is necessary to increase the thickness of the door to more than that of the motor. There are disadvantages that it is impossible to apply the prior device to a vehicle which has a thin or a small door. Further, since parts for connecting the power unit and the linkage mechanism are necessary, the number of the parts of the prior device are large in number, thereby increasing the cost, compared with the present invention.

SUMMARY OF INVENTION

It is an object of the present invention to provide a means which is assembled so as to overcome the disadvantages of the above prior art device.

It is an another object of the present invention to provide a means for automatically opening and closing the window assembly by which the space for installation thereof is considerably reduced so as to be capable of utilizing for a vehicle having a small or a thin door and the manufacturing cost thereof is low.

The means of the present invention is so constructed that an internal gear as an output gear of a reducer which reduces the number of rotation of the motor is integrally formed with arm of which an X-shaped linkage mechanism consists, and by displacing the arm and operating the linkage mechanism the window assembly may be opened and closed. The internal gear may be located either at the end portion or the center portion of the arm. The power unit having the motor and the reducer and the linkage mechanism of the present invention are assembled in one body so that the whole size thereof may be small and the number of members forming the means of the present invention may be reduced. Therefore, the means of the present invention can be attached to the vehicle having a thin or a small door. Further, when the window assembly is opened or closed by operating the linkage assembly, the power unit can be shifted together with the linkage assembly to describe the same trace as the arm, when the motor is located at the center of the arm. Thus, the angle of rotation of the motor necessary to open or close the window assembly becomes twice as compared with the prior art device, as a result, this arrangement derives an excellent advantage in that a motor of small size and small output torque may be employed for automatically opening and closing the window assembly.

These and other objects and advantages of the invention will become apparent from the following description with reference to the accompanying drawings.

BRIEF DESCRIPTION OF DRAWINGS

FIG. 7 is a side view of a means according to the present invention;

FIG. 8 is a sectional view of a motor and arms used in a means according to the present invention showing the location thereof;

DETAILED DESCRIPTION OF INVENTION

Figure 1:
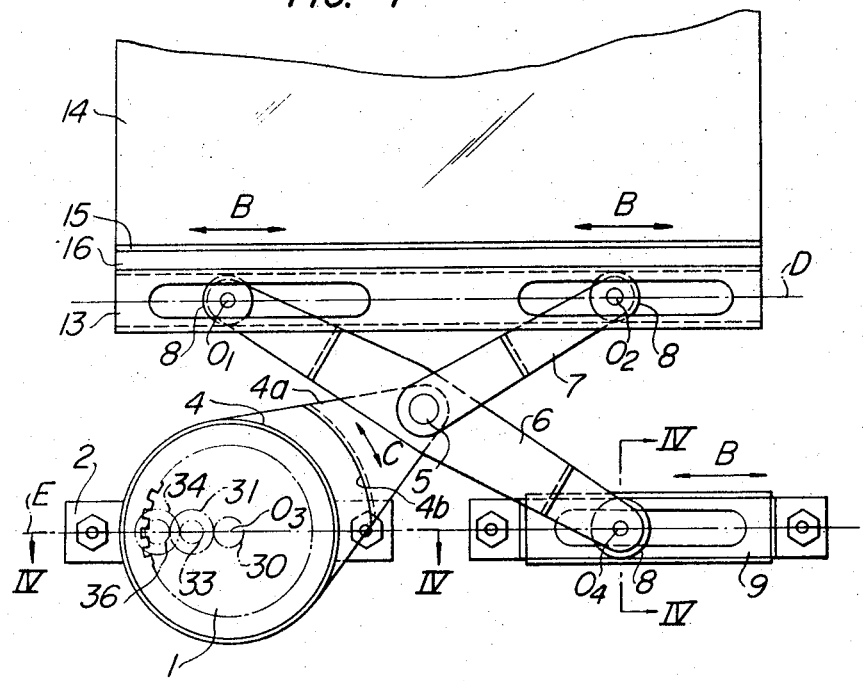
FIG. 1 is an elevational view of an embodiment of the present invention showing the position of the window assembly when risen.
Figure 2:
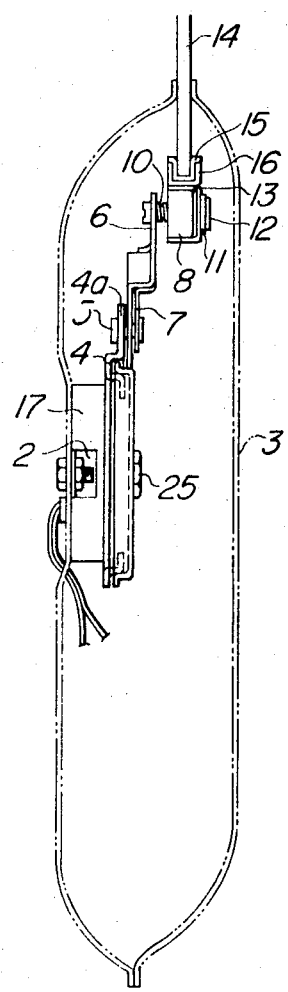
FIG. 2 is a side view of a means according to the present invention.
Figure 4:
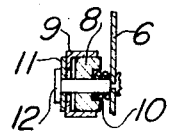
FIG. 4 is a sectional view taken along the line 4—4 of FIG. 1.

Referring initially to FIG. 1 and FIG. 2, a motor 1 with a reducer is secured to a support 2 fixed on a framework 3 of the door of a vehicle. An internal gear 4 is integrally formed with an arm 4a of which a linkage mechanism is composed. The internal gear serves to transmit the rotation of the motor to the arm. The arm 4a is rotated centering around a point $0_3$ in the direction shown by an arrow C, the point $0_3$ being the center of revolution of the motor 1. A center portion of an arm 6 is rotatably connected to the end portion of the arm 4a by a hinge pin 5 firmly set on said arm 4a and an end portion of an arm 7 is further firmly connected to the end portion of the arm 4a through the hinge pin 5. An X-shaped linkage mechanism is composed of these arms 4a, 6, 7. Rollers 8 are rotatably secured to the both ends of the arm 6 and one end of the arm 7. The roller 8 on the right side of the arm 6, as shown in FIG. 4, is positioned within a slider 9 fixed to an inner structure of the door 3 and is rotatably attached to the arm 6 by a rivet 12 by the aid of a coil spring 10 and a washer 11 so as to be capable of sliding within the slider 9 in the direction of an arrow B—B. Other rollers are attached to each end portions of the arms in such a manner as to be capable of sliding in the corresponding sliders 13 in the direction of the arrow B—B. Said sliders 13 are firmly fixed to the framework 16 of the window which is installed through a packing 15 at a lower portion of a window glass 14.

Figure 3:
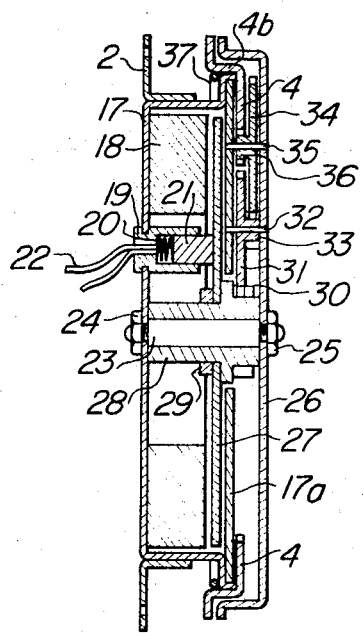
FIG. 3 is a sectional view of a motor and arms used in a means according to the present invention showing the location thereof.

Referring to FIG. 3, the electrical motor 1 with the reducer is illustrated in FIG. 3. The support 2 is fitted to an outer periphery of a housing 17. 18 indicates a permanent magnet which provides a magnetic field. 19 indicates a brush holder, a spring 20 and a brush 21 are inserted suitably therein. A lead wire 22 for supplying electrical power is connected to the brush holder 19. A shaft 23 is provided so as to occupy a proper space between the housing 17 and a case 26. A printed circuit board 27 is closely fitted to a rotatable member 28 by the use of a ring 29, which member 28 is rotatably supported to the shaft 23. A gear 30 is integrally formed on the rotatably member 28. A gear 31 engaged with said gear 30 is rotatable supported to the shaft 32 fixed to the case 26 and a housing case 17a which is secured to the housing 17. A gear 33 of a small diameter is associated with said gear 31. A gear 34 which is engaged with the gear 33 is rotatably supported to the shaft 35 secured to the case 26 and the plate 17a. A gear 36 of a small diameter integrally formed with said gear 34 is meshed with said internal gear 4. A stepped portion 4b of the internal gear 4 is rotatably held at the end portion of the housing 17, and the axial motion of the internal gear is restricted by a stop ring 37. It will be noted that the means of the present invention can be compacted to a small size by situating the internal gear 4 at the outer periphery of the housing 17.

Figure 5:
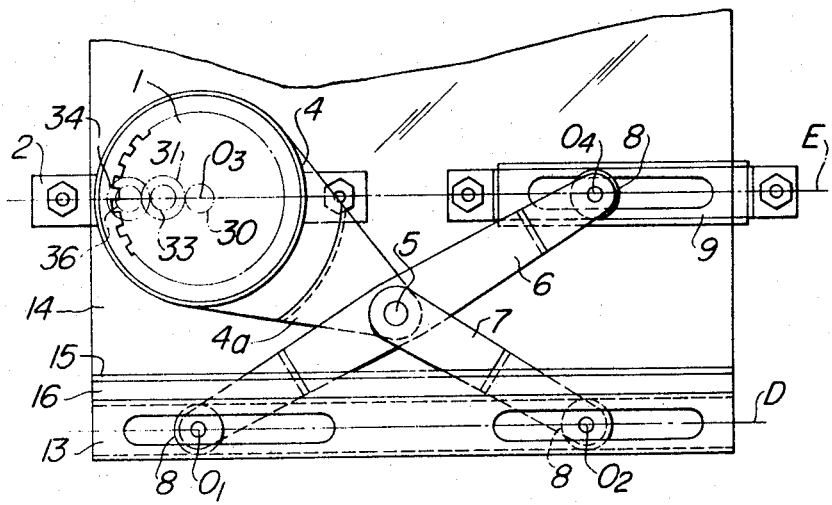
FIG. 5 is an elevational view of an embodiment illustrated in FIG. 1 showing a descended position of the window assembly.

The operation of the above means according to the invention will be described hereinafter. When the motor is in the "on" condition, the rotation of the armature 27 will be transmitted to the internal gear 4 from the gear 36 after reducing firstly the number of revolutions between the gears 30, 31 and then between the gears 33, 34. By rotation of the internal gear 4, each rollers 8 on the end portions of the arms 6, 7 are slid within the sliders 9, 13 outward and the relative angle between one arm 4a, 7 of the X-shaped linkage and the other arm 6 is varied, thereby shifting downward the window assembly. When the line D connecting center points $0_1$, $0_2$ of the rollers 8 in the slider 13 passes over the line E connecting a center $0_3$ of the revolution of the motor 1 and a center point $0_4$ of the roller 8 located in the slider 9, each roller 8 is reversely shifted inward within the sliders 9, 13 so that the window glass 14 may be descended to the position as shown in FIG. 5. It will be understood that the window assembly can be moved up from the position of FIG. 5 to the position of FIG. 1 by reversing the motor 1.

Figure 6:
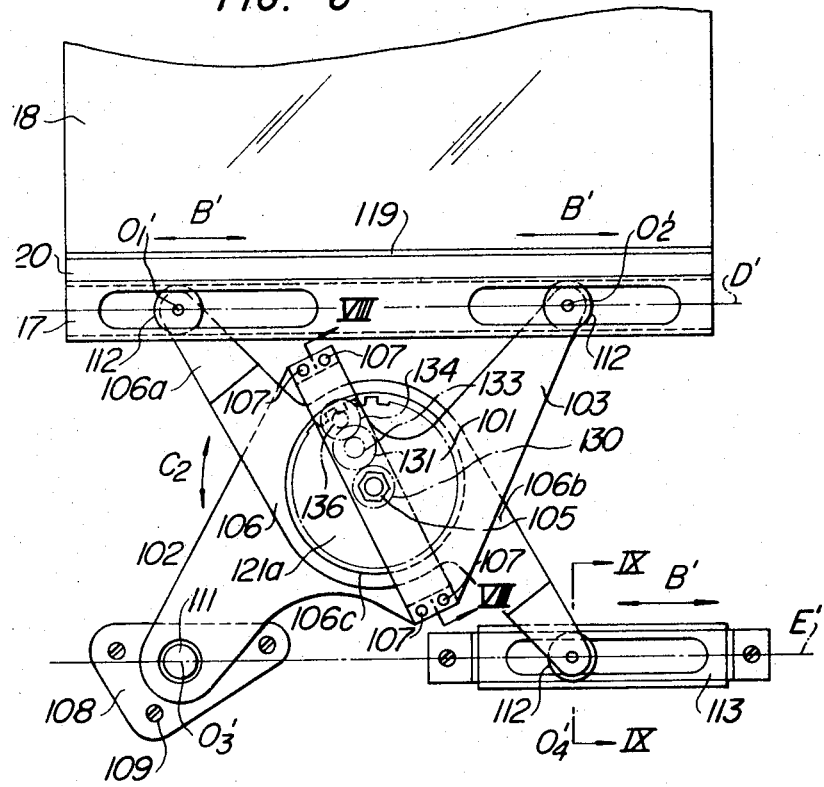
FIG. 6 is an elevational view of another embodiment of the present invention showing a position of the window assembly when risen.
Figure 9:
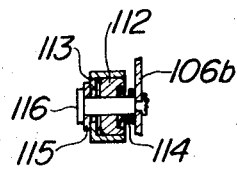
FIG. 9 is a sectional view taken along the line 9—9 of FIG. 6.

An another embodiment of the present invention will be described hereinafter. Referring to FIG. 6 and FIG. 7, a motor 101 provided with a reducer is secured to between arms 102, 103 by a nut 105 through a shaft 104, as shown in FIG. 8, an X-shaped linkage mechanism being constructed by the arms 102, 103 and arms 106a, 106b. An internal gear 106 which has the function of an output gear for said motor 101 is integrally formed with the arms 106a, 106b and the axis of the motor is coincident with that of the internal gear 106. Said arms 102 and 103 are connected by rivets 107. At a center portion of the X-shaped linkage mechanism which consists of the arms 102, 103 and the arms 106a, 106b the motor 101 the motor is located. A support 108 serves to support an end portion of the arm 102, which support is fixed to an inner structure of the door 110 by fasteners such as screws 109. The arm 102 is rotatably secured to said support 108 through a rivet 111. Rollers 108 is rotatably secured to each end portions of the arm 103 and the arms 106a, 106b. Roller 112 on the end portion of the arm 106b, as shown in FIG. 9, is located within a slider 113 fixed to the inner structure of the door 110 and is attached to the arm 106b by a rivet 116 through a coil spring 114 and a washer 115 so as to slide in the direction of an arrow B'–B'. The other rollers 112 are rotatably secured to the end portions of the arms 103, 106a in the same manner as the above so as to slide in the direction of the arrow B'–B'. Said sliders 117 are fixed by means such as welding to a framework 120 attached through packings 119 at a lower portion of the window glass 118.

The motor 101 provided with the reducer will be illustrated in detail in FIG. 8. A motor housing 121 is associated with said arm 102 by means of a nut 105. 122 indicates a permanent magnet. A spring 124 and a brush 125 are inserted into a brush holder 123 which is surrounded by the magnet 122. 126 indicates a lead wire for supplying electrical power to the motor 101. An armature 127 comprising a printed circuit board is fixed to a rotatable member 128 by a ring 129, which member 128 is rotatably supported to the shaft 104. A gear 130 is formed integral on the rotatable member 128 and is so located as to engage with a gear 131 which is rotatably supported by a shaft 132. The shaft 132 is supported to a housing plate 121a fixed to the housing 121 and to the arm 103. A gear 133 having a small diameter is integrally formed with said gear 131 engaging with a gear 134. The gear 134 is rotatably supported to a plate 121a through a shaft 135. A gear 136 having a small diameter is integrally formed with said gear 134 and is so arranged as to mesh with the aforementioned internal gear 106. The stepped portion 106c of the internal gear 106 is rotatably carried at the end portion of the housing 121 and the axial movement thereof is limited by a stop ring 137. Thus, the means according to the present invention may be compacted by carrying the internal gear 106 at the outer periphery of the housing 121.

Figure 10:
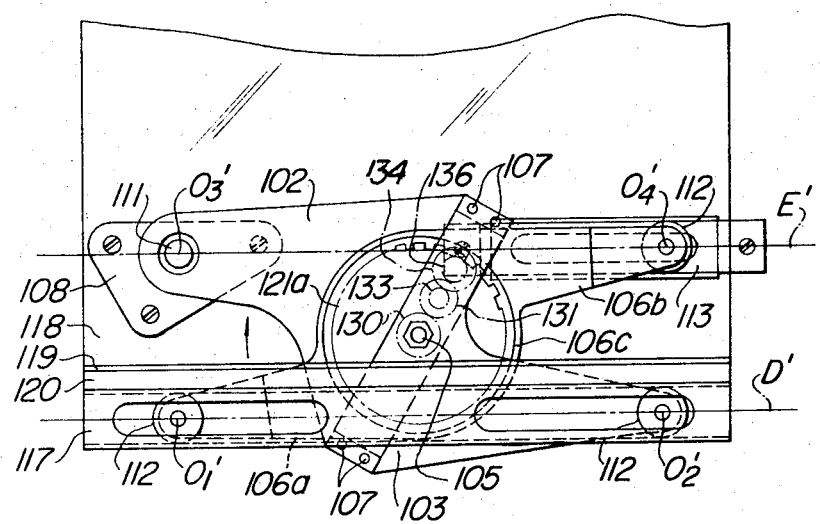
FIG. 10 is an elevational view of another embodiment illustrated in FIG. 6 showing a descended position of the window assembly and FIG. 11 is a graphical view of operation thereof.

An operation of the means of the present invention will be explained hereinafter. Referring now to FIG. 6, when the motor 101 is actuated, the revolution of the armature 127 is firstly reduced by the gears 130, 131 and secondly reduced by the gears 133, 134. The reduced rotation is transmitted to the internal gear 106 through the gear 136, thereby rotating the internal gear 106. In the event that the motor 101 is actuated such that the internal gear 106 may be rotated in the direction of an arrow $C_2'$, the rollers 112 on the arms 106a, 106b and the arm 103 are moved respectively outward within each slider 113, 117. As a result, the relative angle between the arms 102, 103 and the arms 106a, 106b is varied so that the motor 101 may be shifted downward and the window glass may be moved down. When a line D' connecting center points $0'_1$, $0'_2$ of each rollers 112 within the sliders 117 passes over a line E' connecting a center point $0'_4$ of the roller 112 on the arm 106b and a center point $0'_3$ of rotation of the arm 102, the direction of motion of each roller 112 is reversed, that is, shifted inward, and the window glass 118 can be descended down to the position shown in FIG. 10. Also, it will be understood that the window glass 118 can be moved upward to the position shown in FIG. 6, in the case that the motor 101 is reversely actuated.

Figure 11:
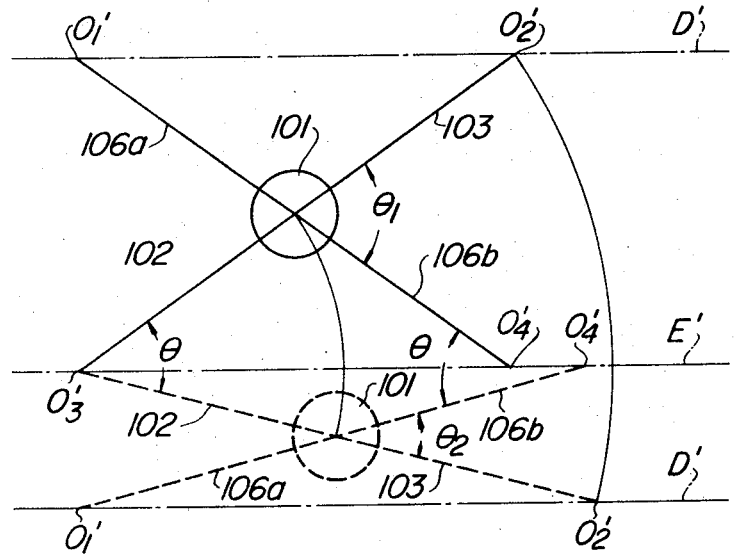

It will be apparent that a kind of pantagraph is constructed by the above X-shaped linkage mechanism. Therefore, said lines D' and E' are always in parallel relation even during movement of the line D'. Referring to FIG. 11, the arms 102, 103 and the arms 106a, 106b forming the X-shaped linkage mechanism should be turned by an angle $\theta$ centering about each points $0'_3$ and $0'_4$ for opening and closing the window glass 118. Since the rotational directions of the arms of the X-shaped linkage mechanism around $0'_3$ and $0'_4$ are reverse to each other, relative angle displacements between the arms 102, 103 and the arms 106a, 106b becomes $\theta_1 + \theta_2 = 2\theta$, and so the rotation angle of the output gear 6 becomes $2\theta$. Thus, if the length of the arms of the present invention forming the linkage assembly is equal to that of the prior art, the rotation angle of the motor 101 will be double. Therefore, from the principle of work load, an output torque of the motor 101 will become half when compared with the prior art. A motor of the small output torque and small size may be employed as the motor 101 for opening and closing the window assembly.

As understood from the above description, since the means of the present invention uses the internal gear as an output gear of the reducer for reducing the rotation of the motor and the window assembly are opened and closed by rotatably displacing the arms forming a part of the linkage assembly by means of the internal gear, production has the excellent advantages that by assembling the linkage mechanism and the power unit in one body the means may be made small in size and the number of indispensable parts for construction are reduced, and, the thickness of the means is remarkably reduced because of the use of a print motor. Therefore, the means of the present invention is effective to be utilized in a vehicle provided with a thin door and may be manufactured at a lower cost.

We claim:

1. Means for automatically opening and closing a window assembly of a vehicle, said means comprising an X-shaped linkage assembly having a first arm and a second arm, a power unit incorporated into said first arm and having a motor and gear means for reducing the number of revolutions per minute of the output of said motor, one end portion of said first arm being rotatably secured to a framework of a door and another end portion being rotatably attached to a second and third arms, said second arm being attached at its central portion to said first arm and having a roller rotatably secured to each end thereof, each of which is operatively associated with a slider, one of said sliders being fixed to said door framework and the other being fixed to said window framework, said third arm being attached at one end portion to said first arm and having another end portion with a roller rotatably attached thereto and operatively associated with a slider fixed to a window framework, said first arm having an enlarged portion wherein said power unit is incorporated and having an internal gear cut in a central portion of said enlarged portion, said internal gear being meshed with said gear means, said enlarged portion being rotatably supported around a periphery of a housing receiving said power unit, stop ring means positioned where said enlarged portion is rotatably mounted to said housing for preventing said first arm from axial movement.

2. Means according to claim 1 being characterized in that the end portion of the arm which is not provided with a roller is enlarged, an internal gear being provided at the central portion of the enlarged portion, and said internal gear being meshed with the train of gears so as to transmit the rotation of the motor located on the inside of the door to the internal gear, thereby angularly displacing said arms and opening or closing the window assembly.

3. Means according to claim 2 being characterized in that a motor housing is so arranged as to be fitted in said enlarged portion of the arm fixed to the inside of the door.

4. Means for automatically opening and closing a window assembly of a vehicle, said means comprising an X-shaped linkage assembly having a first arm and a second arm, a power unit incorporated into said first arm and having a motor and gear means for reducing the number of revolutions per minute of the output of said motor;

one end portion of said first arm being rotatably secured to a framework of a door and another end thereof having a roller rotatably secured thereto and operatively associated with a slider fixed to a window framework;

said second arm having a roller rotatably secured to each end thereof each of which is operatively associated with a slider, one of said sliders being fixed to said door framework and the other being fixed to said window framework;

said first arm having an enlarged portion thereof wherein said power unit is incorporated and having an internal gear cut in a central portion of said enlarged portion, said internal gear being meshed with said gear means, said enlarged portion being rotatably supported around a periphery of a housing receiving said power unit;

stop ring means positioned where said enlarged portion is rotatably mounted to said housing, for preventing said first arm from axial movement.

5. Means according to claim 4 being characterized in that a motor housing being so arranged as to be loosely fitted in said first arm.

* * * * *